Patented Apr. 16, 1929.

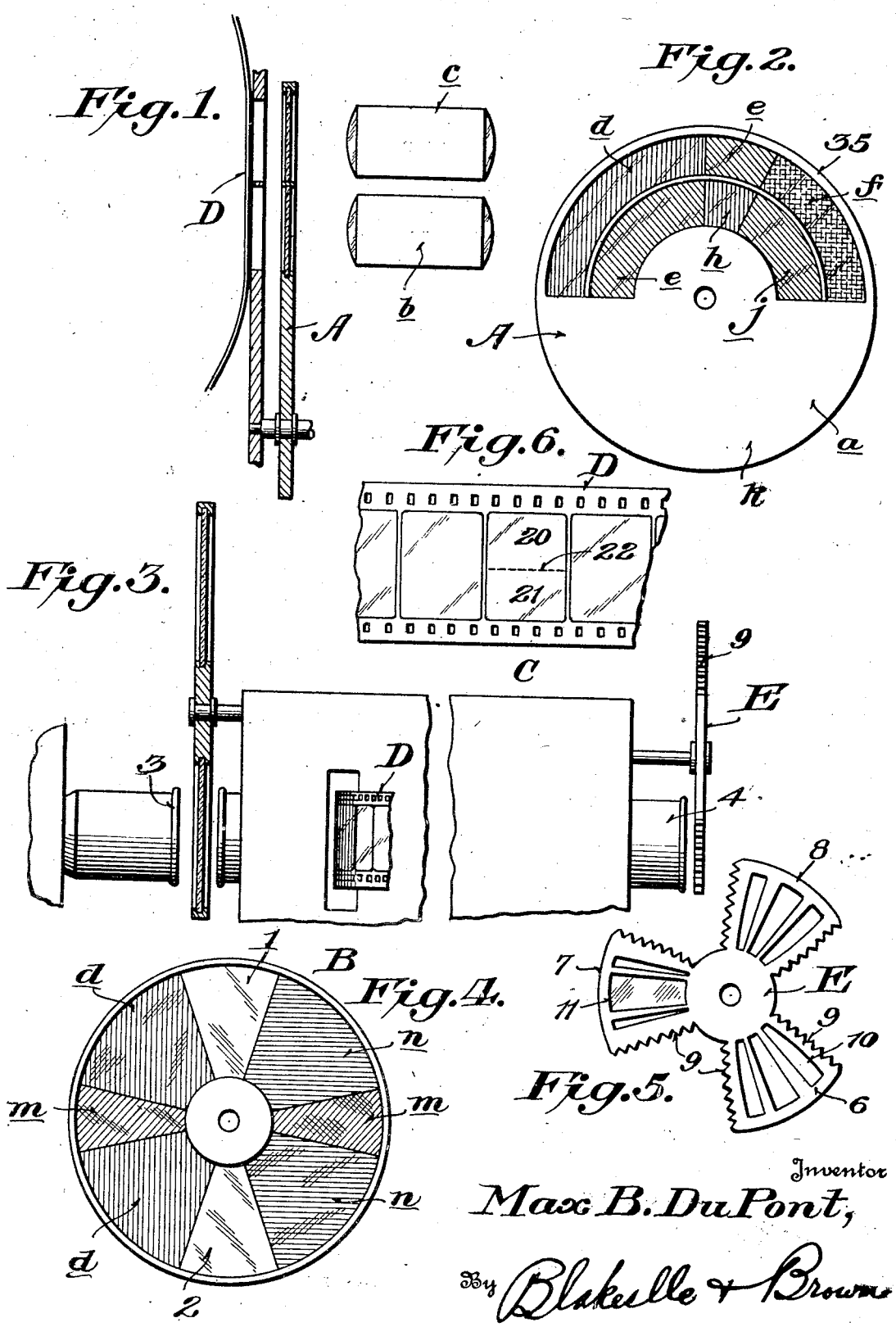

1,709,341

UNITED STATES PATENT OFFICE.

MAX B. DU PONT, OF LOS ANGELES, CALIFORNIA, ASSIGNOR TO MAX B. DU PONT VITA-COLOR CORPORATION, OF LOS ANGELES, CALIFORNIA, A CORPORATION OF DELAWARE.

APPARATUS FOR PROJECTING MOTION PICTURES IN COLOR.

Original application filed January 18, 1926, Serial No. 81,992. Divided and this application filed December 8, 1926. Serial No. 153,339.

This invention relates to the general art of color photography and more particularly to novel means for projecting pictures in color so that the original color values of the object photographed are preserved and again re-created upon the screen.

A primary object of the invention is to provide a projecting apparatus especially adapted for use in reproducing from film, motion pictures in color of the type taken in accordance with the method and apparatus disclosed in my co-pending application Serial No. 81,992 filed January 18, 1926, of which this is a division. In that connection it is one of the objects of the invention to provide a construction which will practically do away with any overlapping of colors, or what is ordinarily known as fringe.

With the above and other objects in view which will more readily appear as the nature of the invention is better understood, the same consists in the novel construction, combination and arrangement of parts hereinafter more fully described, illustrated and claimed.

In the accompanying drawings:

Figure 1 is a fragmentary cross sectional view showing two lenses adapted to register values on two panels of a film simultaneously;

Figure 2 is a plan view of a filter member which I may use in the taking of colored pictures;

Figure 3 is a fragmentary and partially sectional view of a projection machine incorporating the invention;

Figure 4 is a plan view of a filter which may be used with the projection machine;

Figure 5 is a plan view of shutter mechanism for the projection machine, and

Figure 6 is a plan view of a strip of film.

Similar reference characters designate corresponding parts throughout the several figures of the drawings.

In accordance with the method outlined in my copending application aforesaid I provide a device designated generally as A which is used in the taking of the colored pictures and which consists of a disc $a$ adapted to be placed behind or in front of the camera lenses $b$ and $c$, as shown in Figure 1, and such device is adapted to be rotated. This disc has thereon certain filter combinations, the principal segments having the following filter combinations,—orange red $d$, green $e$, and orange yellow $f$. The lower segmental filter combinations are green $e$, red $h$ and blue green $j$. It is to be noted that this disc also has a shutter portion $k$ which subtends an arc of approximately 180 degrees. It is noted that each of these filters on the said disc are in the form of hollow sectors, and the inner sectors are slightly spaced from the outer sectors. In the present embodiment of the invention I have provided two lenses whereby two panels or frames of film may be photographed of the same scene at a time and through the said filters. To this end it will be necessary to change the mechanism of the camera to make this possible. However, the invention could be readily modified by providing the sectors $e$, $h$ and $j$ at the shutter portion $k$ and shorten the different lengths of sectors or degrees of arc subtended by each to provide segmental opaque portions or shutter portions between the two groups of filter combinations. I have found it an advantage in my particular system of color photography to take two pictures at a time, as shown in Figure 1, because in fast action close to the camera the fringe effect is eliminated for the reason that the picture is taken in groups of two panels or frames, each panel of said group of two having an alternate color value with the action thereon identical; therefore there is no retard or advance of the action from the first to the second frame. I use the disc designated generally as B in Figure 4 in my projection machine. This disc is provided with sectors or segments containing colored filters, one group of which contains the segments $d$, $m$, $d$ consisting of orange red, violet and orange red, while a second group $n$, $m$ and $n$ is blue, violet and blue. These two groups are separated diametrically by two shutter portions 1 and 2. This particular disc is used with the projection machine C shown in Figure 1. It is to be noted that the disc B is mounted for rotation in front of the condenser 3, and that the strip film D, on which are pictures to be projected from such projecting machine, lies between the projecting lens mount 4 and such disc B. Adapted to be placed in front of the mount 4 is means E which is a shutter device adapted to synchronize the color values to overcome any flicker. This shutter device is adapted for rotation in front of the mount 4 and comprises three spaced sector portions 6, 7 and 8, which are equi-distantly spaced apart, the sides of which are serrated as shown at 9 so that the so-called shadow effect due to the rotation of the parts 6, 7, 8 over a projected picture, will not be abrupt. Furthermore, the said sector portions are provided with cut-away portions designated generally as 10, and the size of these cut-away portions will depend upon use and service. For instance, the sector 7 has an enlarged cut-away portion 11 adapted to hold either some opaque medium or some colored material to supply any color that might be lacking in the picture projected. For instance, a yellow filter might be placed within the cut-away portion 11 to supply any yellow that might be needed.

I have arranged the time of sweep or length of sweep together with the density or transmitting power of each filter section over a given frame or film in accordance with either the wave length of the different colors of the objects to be photographed or approximately in accordance with the reflecting power of color vibration of the object being photographed and the multiplying factor or transmitting power of the filters, so that the resultant exposure for each color will be in such a ratio for the three filters that a correct color rendering will be obtained, together with a correct exposure, and likewise in such a manner that one color is not necessarily exaggerated at the expense of the other. Furthermore, and of prime importance is the fact that I provide in my filters either of the form shown in the projection machine or the form used in the taking of pictures, groups of filters, two of which are related or of like nature from a color stand-point, with an intermediate filter which is opposite or complementary to the other two filters on each side thereof. This will immediately be perceived upon inspection of Figure 2 wherein green is interposed between orange red, and orange yellow filters, the green being complementary to the orange red and orange yellow filters. This particular feature in my method of taking colored pictures allows me to obtain results not heretofore obtainable so far as the inventor is aware, for the reason that the color complementary to the other two colors allows a non-over corrected picture to be taken for the reason that the center color section is complementary to the other two color or sections which tunes the wave length of the filter sectors; in other words, the center color section will eliminate the excess of vibration transmitted by the other two color sections and allows a non-over corrected picture with full exposure, or in other words, a triple exposure of the colors are recorded which soften the general effect and give more half tones. The result is so perfect that it is almost impossible to see a difference between the alternate frames of pictures, and this explains why flicker and pulsation is overcome in any movement from one color to another. This is particularly noticeable when an object is photographed through a red filter. The red is liable to be exaggerated and requires softening and to do this prior investigators in color photography have inserted opaque masks, as I have heretofore pointed out, or have cut slots in the filter, but this allows a space in the filter which cuts down the exposure or admits white light which destroys the filter value and this renders the taking of pictures for colored photography purposes impractical except under the most favorable conditions, that is, in natural sunlight. Inspection of Fig. 2 will show that I have no opaque masks nor slots in the group of filters and that the sweep or the exposure of the frame to the groups of filters is continuous and that I tone the reds by a complementary filter, in other words, the red filter leads, the green filter follows to tone the effect of the first impression given by the red filter upon the film, and which green filter is further followed by another red filter. The same procedure would take place for the lower group of filters. This toning feature and allowing full time of exposure of the object to the film produces results wherein one color is not exaggerated at the expense of another. It will be observed that the disc B does not have filters thereon or colored segments which are identical with the filters of the disc A and for several reasons, namely, an arc light is used in the projection machine which transforms the colors, for instance, an arc light usually has a certain amount of yellow therein and when this yellow light is passed through blue the resultant projected color is a green. The violet color helps to correct the crudeness of the red. The group of colors of the disc B, namely, the blue, violet, and blue would act in conjunction with that panel of the film which was photographed through the filter combinations e, h and j, or, green, red and blue green. The group on the disc B containing orange red, violet, orange red, would act in conjunction with that panel of the film which was photographed through the filter group of the disc A containing orange red, green, orange yellow.

Referring to Figures 2 and 6, if the film shown in Figure 6 were used in conjunction with two lenses, one above the other, and the said film run sideways past the said two lenses, the side disc A being interposed between the lenses and the film, it would be possible to take two pictures through different groups of filters and on one panel, as indicated by 20 and 21, the line of division being indicated as 22. In this case the lenses would have to be adjusted so as to divide the space upon the single panel. This method would of course save film.

Any form of panchromatic emulsion now on the market can be used with my process of taking colored pictures, as I can readily vary the exposure of the same in the same manner as is universally done at the present time by camera men. I preferably regulate my color system so that I approximate or equal a true spectrum with the result that a spectator does not view a flat field but receives a stereopticon impression.

It is not to be understood that I project two panels at a time, but rather one panel at a time is projected through the projecting machine C.

One great disadvantage of the present method of color photography wherein the film itself is coated with a dye, is due to the fact that when film so dyed is projected, the different dyes used often clash with each other and produce a muddy effect. In other words, if a film is coated on one side with red dye and on the opposite side with green, it is evident that the resultant colors when projected will not be either a true red or a green, but will lie somewhere between the two, and thus the colors are not true to life.

In the showing of Figure 2 I have illustrated a certain arrangement of the different filter groups which produces good results under ordinary conditions and wherein, assuming 180 degrees of arc for each filter group, the filters d and e of the upper and lower groups would subtend an arc of 90 degrees, the filters e and h of the upper and lower groups 27 degrees, and the filters f and j 63 degrees. Considered in a different manner and on a 100 point scale for upper and lower like groups the filters d and e would be 50 per cent or 50 points, the filters e and h 15 points or 15 per cent, and the filters f and j 35 points of 35 per cent. This percentage would not necessarily hold for the filter groups of the disc B, and for the reasons that have heretofore been set forth, namely, because of correction for certain colors when projected.

Generally speaking the principle of my invention consists in the tuning of the wave lengths of the different filters by utilizing a filter which is contrary to the two filters on opposite sides thereof. By utilizing this method I overcome flickering effect and crudeness of color when the picture is projected onto a screen.

I may accomplish various effects by my apparatus. For instance, I may photograph the film in such a manner that one-half of a panel or a series of panels is black and white and the other half utilizes my system of color photography. This would provide a system of double exposure which would be novel. Or, I might utilize the method of commencing a picture in ordinary black and white and allowing a fade-in of color and then permitting a fading out of color. In fact, any different colored effects desired are readily produced from the most vivid shades to pastel shades.

Having thus disclosed my invention, I claim and desire to secure by Letters Patent:

1. A motion picture projection apparatus adapted to project non-contrast pictures made on a standard panchromatic film including a condensing lens and a projecting lens, means for passing the film strip between the condensing and projecting lenses, a filter screen arranged between the condensing lens and the film, said color screen including diametrically opposite opaque shutter portions and color filter units arranged between said opaque shutter portions, said color filter units including filter sections of the same wave length and an intermediate toning filter of different wave length, the sections of each filter unit having their edge portions contiguous.

2. A motion picture projecting apparatus including in combination, a condensing lens, a projecting lens, means for passing a film between the condensing and projecting lenses, a color screen rotatably mounted to operate between the condensing lens and the film and comprising a circular disk having diametrically opposite opaque shutter portions and color filter units lying between said opaque shutter portions and each including three filter sections two of which constitute major filter sections of the same color wave length and an intermediate toning filter section of different wave length, and a flicker shutter synchronized with the color screen and operating in front of the projecting lens, said flicker shutter comprising a series of radially disposed slotted sector portions having serrated side edges.

3. A motion picture projection apparatus adapted to project non-contrast pictures made on standard panchromatic film including a condensing lens and a projecting lens, means for passing the film strip between the condensing and projecting lenses, and a combined color filter screen and shutter disk arranged between the condensing lens and the film whereby the light passing through the film carries the color of the filters through the same.

4. A motion picture projection apparatus including in combination, a condensing lens, a projecting lens, means for passing a film between the condensing and projecting lenses, a color screen mounted to rotate between the condensing lens and the film and comprising a circular disk having two color filter portions each of which contains three color filters of sector-like shape, the intermediate color filter being of less area than the color filters at each side thereof and of different transmitting power therefrom.

In testimony whereof, I have signed my name to this specification.

MAX B. DU PONT.